Figure 1:
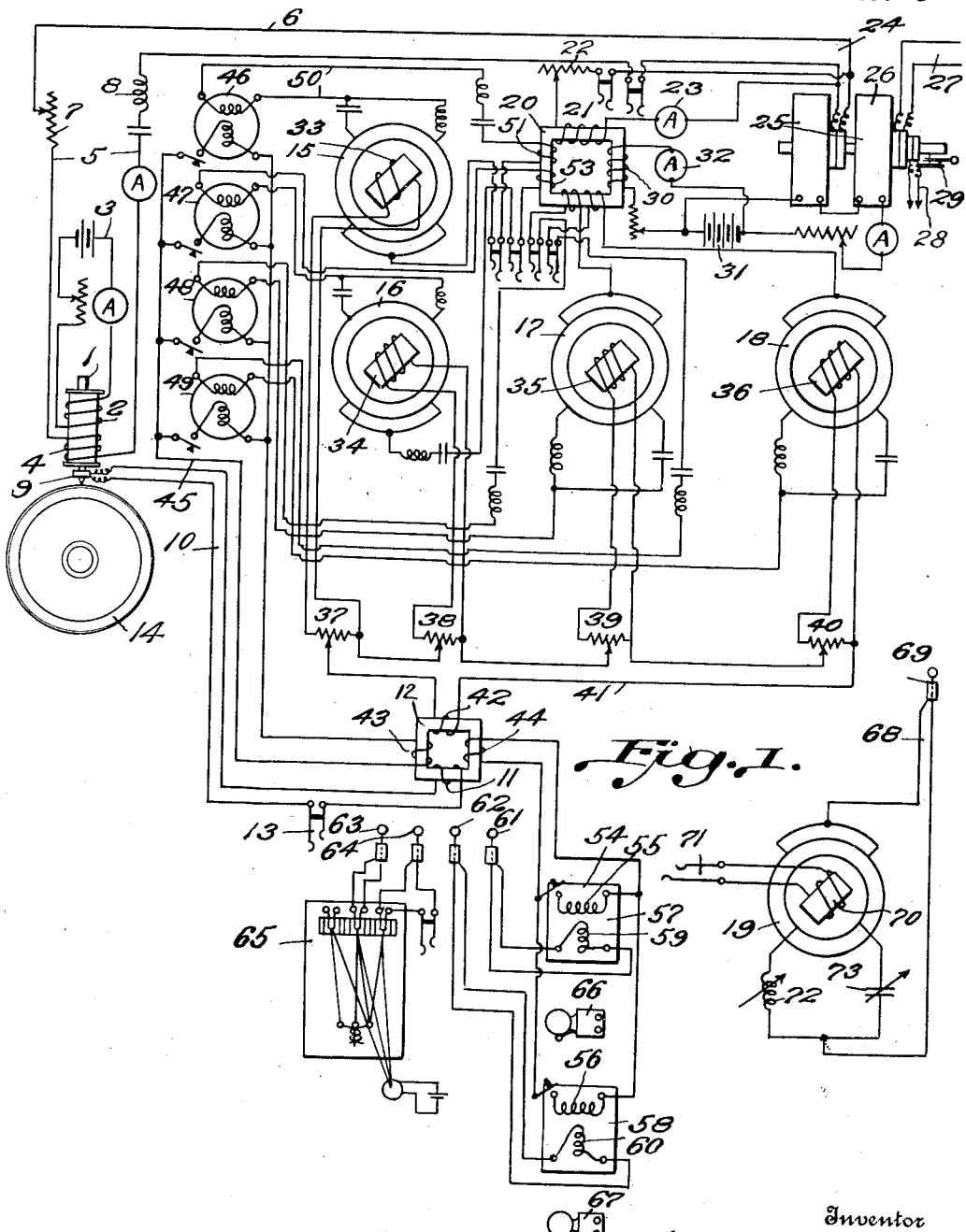

May 23, 1933. C. KINSLEY 1,910,770
MAGNETIC TESTING OF MASSES
Filed Feb. 27, 1928    2 Sheets-Sheet 1

Inventor
Carl Kinsley
Edward E. Clement
By
Attorney

May 23, 1933.    C. KINSLEY    1,910,770
MAGNETIC TESTING OF MASSES
Filed Feb. 27, 1928    2 Sheets-Sheet 2

Inventor
Carl Kinsley
By Edward E. Clement
Attorney

Patented May 23, 1933

1,910,770

UNITED STATES PATENT OFFICE

CARL KINSLEY, OF SCARSDALE, NEW YORK

MAGNETIC TESTING OF MASSES

Application filed February 27, 1928. Serial No. 257,297.

My invention relates to the art of magnetic testing of metals, and particularly of iron and steel, and it has for its object to render possible the detection of variations and defects which have heretofore escaped detection or measurement because of inherent limitations in the principles employed. Thus, it has been proposed to test steel bars and similar pieces by exposing them to an alternating magnetic field, thereby producing an alternating magnetic flux, and then causing the flux, as modified by flaws or breaks of the bar or piece under test, to affect secondary coils connected to a circuit or circuits containing an indicating device. It has also been proposed to produce a permanent magnetic field including a portion of the piece under test and to expose a secondary coil or the equivalent to the action of the magnetic flux produced thereby, so that by producing a relative motion of the piece and the secondary, an E. M. F. will be induced in the secondary circuit which would vary proportionately to variations in the characteristics of the piece under test. Any defect producing a leakage field would then be detectable by an indicating instrument in the secondary circuit.

Both of these methods, and others employing similar principles, are subject to limitations which render them unsatisfactory in practice. In the first case, the effect of an alternating field is largely confined to the outer portion or skin of the piece under test, whereby no sensible indications are given of defects which lie below a certain depth within the body of the same. In the second case, it is difficult, if not impossible, to maintain uniformity of motion, so that reliable quantitative observations and measurements are impossible. Also, in approaching the end of a bar or piece, additional difficulties are encountered by reason of the end effect which is familiar to those skilled in the art.

I avoid the foregoing and other objections to methods heretofore employed, and attain my object by combining a permanent magnetic field with an alternating field and arranging the latter so that it will be affected by variations in the characteristics of the test piece. Instead, therefore, of depending upon either mechanical movements or simple alternating excitation, I am enabled to induce in a secondary circuit asymmetric waves varying with the variations in the characteristics of the test piece, and combining all advantages in respect to detectability thereof of both the preceding methods, without their disadvantages or limitations. Thus, the lack of penetrability of the alternating current effect alone is avoided, because the constant magnetic field renders the alternating magnetic flux asymmetrical and variations in the characteristics of the test piece are reflected through variations in the asymmetric flux both for superficial and for deeper-seated flaws and the like, because said flux is a composite produced by both continuous and alternating fields. The resultant asymmetric waves in the circuit are as closely characteristic of the variations by which they are produced as the waves or curves due to the simple alternating current method. It is of course possible to render these waves or the curves produced thereby symmetrical, and in practice this may be done by the use of even harmonics, as will appear hereinafter.

Among the faults which have heretofore been difficult or impossible of detection in iron and steel masses of various kinds, are pipes, seams, spauls, temper cracks, surface checks, intrusions of slag, carbides and foreign matter. In the application of my method to such objects as car wheels, which will be herein described, the matter of penetration is of primary importance for obvious reasons, and furnishes a means for study which is much needed because of the wide and unexplained variations in such products, probably due to some unknown or unnoticed variations in the mill operations which have not heretofore been corrected and cannot be corrected without such means of study.

Stated in terms of apparatus, I employ two or more primary exciting coils, one carrying alternating current and the other carrying a continuous current, and a secondary coil related to all the primaries so as to be affected by the composite magnetic fluxes due thereto. The first coil is fed with alternating current which is conveniently a pure sine wave current of the fundamental frequency produced by a suitable generator, and harmonic frequencies of the same are made available for the production of a synthetic wave which is used in a manner very similar to that disclosed in my copending application Serial No. 257,296 executed and filed of even date herewith.

Suitable indicating means are inductively connected to the secondary circuit, and also to the sources of the synthetic wave and to certain measuring instruments which will be presently described. In operation, the magnetic field structure is adjusted with respect to the test piece, and by means of frequency selectors an approximate balance is obtained, after which the testing proceeds in substantially the same manner as in my companion application referred to, more exact adjustment of harmonics being resorted to, if desired, during the operation. The permanent field produces a flux in the test piece which penetrates as deeply as desired, while the magnetic flux due to the alternating current is combined therewith, and the combined reactance effect produces asymmetric waves in the secondary which, after proper adjustments have been made, are truly representative of variations in the structure of the test piece. It is to be noted that in testing masses such as car wheels, the field structure is necessarily provided with a magnetic core of its own, which is energized by both the direct current and the alternating test current, resulting in a flux variation which introduces both odd and even harmonics in the secondary circuit which are independent of the harmonics introduced by the flux variations in the car wheel under test. The system shown makes it possible by means of the harmonic selectors to balance out from the secondary circuit the harmonics introduced by the core of the testing magnet and which would otherwise tend to confuse the interpretation of the harmonics present which were introduced by the flux variations in the car wheel upon which the determination of the characteristics of the metal depend.

It is to be understood that I am not limited to any particular type or class of articles to be tested, as some of the flaws hereinbefore mentioned are particularly found in rods and bars. In such cases I provide solenoids with the secondary coils in proper relation to the primary alternating current field coil, so that the bars or rods may be passed through them. Except for this difference in the mechanical arrangement of the parts, and other differences produced by the elimination of the energizing magnet core, the principle involved and the method of operation are substantially the same.

It is to be noted that by comparison with the resources of the prior art, however, this form of testing apparatus is very much more efficient for the reason that I am enabled to balance out all differences between the secondary coils and to overcome at will the end effect, so that a bar or rod may be tested all the way to the end, in general.

Figure 3:
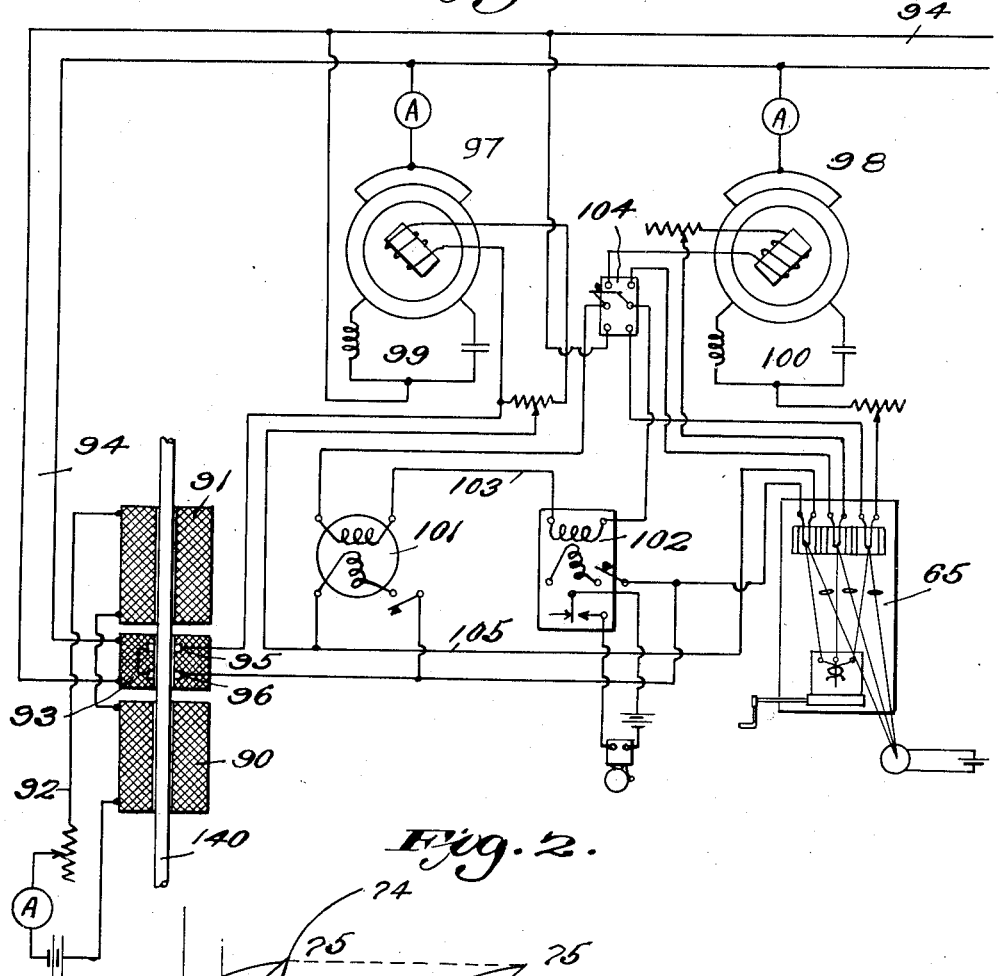
Figure 2:
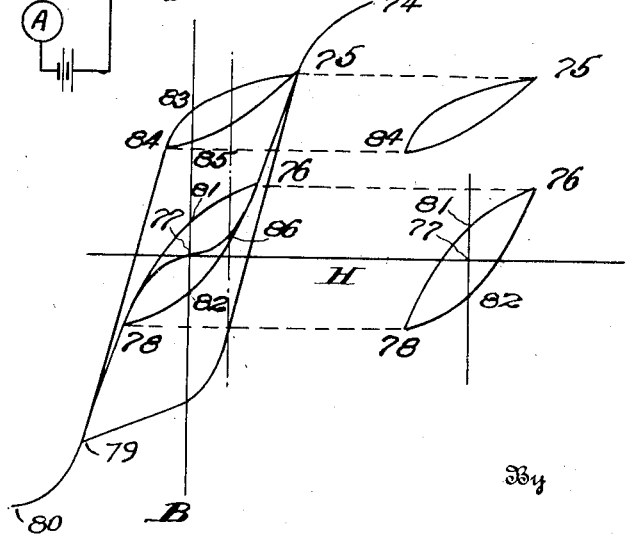

My invention is illustrated in the accompanying drawings, in which Fig. 1 is a diagram showing the method applied to testing car wheels. Fig. 2 is a diagram showing the form of asymmetric magnetic flux produced thereby, which is characteristic of the variations in the metal. Fig. 3 is a diagram showing the basic principle of my invention embodied in somewhat different form from that in Fig. 1, the continuous current and the alternating current fields being arranged for the testing of bars and the like.

Referring to the drawings, and first to Fig. 1, 1 indicates a magnetic structure carrying the primary energizing coil 2 included in a continuous current circuit 3 and an alternating current energizing coil 4 included in the circuit 5, which constitutes a continuation of the alternating current supply circuit 6, the only difference between the two circuits being that an adjustable resistance 7 and a filter 8 are included in the circuit 5, so that the current traversing the coil 4 is an approximately pure sine wave of fundamental frequency. The secondary winding 9 is connected in a circuit 10 which passes to winding 11 on the transformer 12, and includes in series jack 13, having a purpose to be described. 14 represents a car wheel to be tested. 15, 16, 17, and 18 are harmonic selectors, each constructed and included in a branch circuit which is tuned to pass only its own harmonic frequency. The fields of all of these are supplied with current from secondary windings of the transformer 20, whose primary winding 21 is connected through an adjustable resistance 22 and an ammeter 23 to the alternating current supply circuit 24 from the generator 25. This generator is shown as driven by a motor 26, deriving its power from the circuit 27, with a speed control circuit 28 and a governor 29. One winding 30 on the transformer 20 is supplied with continuous current from the source 31, which may conveniently be the same source which excites the field magnets of the motor and the generator 26 and 25, as shown. This circuit also conveniently includes an ammeter 32. The purpose of thus energizing the transformer core is to produce asymmetric waves. 33, 34, 35 and 36 are phase adjusters, whose armatures are connected in series through adjustable resistances 37, 38, 39 and 40 to the circuit 41, which includes the winding 42 on the transformer 12. This transformer has two other windings, 43 and 44, the former connected through circuit 45 to normally open bridges including the movable coils of voltmeters 46, 47, 48 and 49. The primary or fixed winding of the voltmeter 46 is connected to circuit 50, which includes in series therewith the field circuit of the phase adjuster 33 and a winding 51 on the transformer 20. The fixed coil of voltmeter 47 is similarly connected in the circuit 52, including winding 53 on the transformer 20 and the field of the phase adjuster 34. The fixed coil of each of the voltmeters 48 and 49 is similarly connected in series with a winding on the core of the transformer and with the field of one of the phase adjusters 17 and 18. Each voltmeter therefore is associated with one of the phase adjusters and with one winding on the transformer 20. By overloading this transformer, therefore, and properly tuning the circuits of the phase adjusters or frequency selectors of which they form a part, I may supply any of these frequencies to the circuits of the voltmeters and all of them to the circuit 41 and the winding 42 of the transformer 12. The frequencies I employ here are both odd and even harmonics of the first harmonic or fundamental frequency of the current supplied through circuit 5 to the energizing winding 4 of the test magnet 1. By means of the connections thus described, the transformer 12 becomes an inductive composer through which the synthetic wave in circuit 41 and the currents induced through the secondary coil in circuit 10 are combined to produce in the circuit 54 waves of the form desired for purposes of observation, indication and recording. The circuit 54 carries in two open bridges the fixed coils 55 and 56 of sensitive relays 57 and 58, whose movable coils or secondaries 59-60 are connected to plugs 61-62, respectively, these plugs being adapted for insertion into the several jacks shown, for the purpose of varying the frequencies which may be supplied to the coils 59—60, and for other purposes which will sufficiently appear from the statement of operation.

Also provided with plug terminals 63-64 is the oscillograph 65, which may thus be connected in various combinations as desired. The relays 57 and 58 control sensible indicating devices which are typified by the electric bells 66-67. The phase adjuster 19, which is also intended for use in various combinations with other pieces of apparatus in the set, has its tuned selective circuit 68 terminating on a plug 69; and its armature 70 connected to a jack 71 to which any of the plugs shown may be fitted. The tuning elements 72-73 of the circuit 68 are adjustable, whereby any one of the several harmonic frequencies may be selected.

Fig. 2 illustrates a characteristic piece of magnetizable material subjected to a magnetizing force shown on the axis H, and the corresponding magnetic flux on the axis B. The curve 74-75-76-86-77-78-79-80 is sometimes designated as a static curve obtained from measurements with a battery current. The irregular curve 76-81-78-82 is a hysteresis loop obtained when a magnetizing force is provided by an alternating current and the magnetizable body is normally in a neutral condition, so that the above loop is symmetrical about the point 77, which is the intersection of the two axes H and B. The loop 75-83-84-85 is produced by the same magnetizing force provided by an alternating current, but here the magnetizable body has initially a magnetization shown on the diagram by the point 86. These two loops are repeated on the right of the main curve so as to emphasize the fact that the lower loop in which there is no initial magnetization of the specimen is symmetrical, while the upper loop having an initial magnetization of the specimen is asymmetrical. A secondary circuit which is acted upon by the lower symmetrical loop will give an induced symmetrical E. M. F. having positive and negative portions the same, while the upper loop, being asymmetrical, will give an asymmetrical E. M. F. If these two E. M. F. curves were analyzed it would be found that the lower one contained only odd harmonics, while the upper one contained both odd and even harmonics. If then it be desired to form a synthetic curve similar to the two obtained by induction from such alternating current fluxes it would be necessary to use in the lower one only odd harmonics, and in the upper one both odd and even harmonics.

In the operation of the testing device described, any change in the magnetizable material due to change in its characteristics or physical condition will cause the constant magnetic flux, which in the figure is shown to be equal to 86, to assume a different value, and this will produce a differently shaped loop caused by the alternating flux which will result in a secondary curve of E. M. F.'s which will differ from the first, and both of which will contain both odd and even harmonics whose differences may be used for the purpose of obtaining the characteristics of the material.

Referring now to Fig. 3, I have therein shown the application of the same principles embodied in the system of Fig. 1 to the testing of rod or bar stock. Two coils 90 and 91 are fed with direct current through the circuit 92 and an intermediate solenoid or coil 93 is fed with alternating current from the supply circuit 94. Two secondary coils 95-96 are located within the primary coil 93 and are spaced apart as shown, sufficiently to permit any differences which occur in the structure to affect the two coils differently. 97 and 98 are harmonic selectors included in tuned circuits 99 and 100 connected to the primary supply circuit 94. 101 is a voltmeter similar to the voltmeters 46-49 in Fig. 1, and 102 is a relay similar to the relays 57–58 in Fig. 1. Voltmeter 101 has its primary or fixed coil connected in series with the primary or fixed coil of the relays 102 in a circuit 103 connected to the blades of the double-pole double-throw switch 104, by which connection may be effected either through the oscillograph 65 and the harmonic selector 98 to the supply circuit 94, or through the armature of the phase adjuster and the oscillograph. The harmonic selector 97 has its armature included in the secondary circuit 105, whereby the harmonic frequency derived therefrom may be used either in the voltmeter 101, the relay 102 or the oscillograph 65.

The operation of my method with the apparatus described in Fig. 1 is as follows:

The magnet structure 1 being placed in position with respect to the test piece, which in this case is a car wheel, I first take the voltmeters 46–49 in succession one at a time, and find the amplitude and phase of the harmonics to which they are responsive, then neutralize the harmonics from the secondary circuit by the one introduced by the harmonic selector or phase adjuster. Upon the completion of this the E. M. F. produced by the secondary will have been substantially neutralized by the harmonic selectors and the current in the secondary circuit 10 will be substantially zero. Without changing the adjustment of the circuit the testing magnet is placed in a new position and the current which now appears in the secondary testing circuit 10 will be caused by the differences between the characteristics of the material in the two places. By this process the spurious secondary E. M. F.'s introduced by the core of the testing magnet 1 will have been neutralized and the differences which appear will be then due only to the material under test.

By means of the transformer 12, any changes of any current in the circuit 10 are combined with the synthetic wave in the circuit 41 and through the winding 44 are made available for observation, measurement or recording. The oscillograph 65 may be connected either to the jack 13, or by means of its own jack, in series with plug 64, may be connected through the circuit 54 to receive and record the waves propagated therein. Similarly, either one of the relays 57 or 58 may be plugged in on any of the jacks on the transformer 20, or the jack 71 leading to the special harmonic selector 19 or into the jacks shown connected with the alternating current primary supply circuit 6.

In the system shown in Fig. 3 the operation is as follows:

The test piece marked 140 being in position in the solenoid field coils 90, 91 and 93, and the secondary coils 95 and 96, as shown, if there is no flow within the field of the secondary differential coils, then the voltmeter, the relay or the oscillograph will give no indication, but as the test piece is moved along and a flow affects one of the differential coils before it does the other, then there will be a differential E. M. F. in the secondary circuit 105 which will cause an indication in the voltmeter when it is connected to the circuit, or in the oscillograph the exact character of the change can be noted, or in the relay the torque produced due to this change in the secondary current can be caused to close the local circuit and affect the indicating devices connected therewith. I have said that there may be a zero current in the secondary circuit 105, but it is to be noted that this condition can only be secured when the harmonic selector 97 has been properly adjusted as to phase and amplitude to neutralize any differences that there may be between the differential coils 95 and 96. When approaching the end of the bar the leakage field which will unbalance the differential coils can be neutralized by a proper adjustment of the phase adjuster 97, so that the presence of any flux may be detected independently of the leakage field due to the end effect of the bar. When the switch 104 is on the lower contacts one of the coils of the voltmeter and relay is energized from the field circuit of the phase adjuster 98, which is so designed as to give the desired torque in the relay for any unbalancing of the differential coils. When the switch is thrown on the upper contacts, the phase adjuster 98 can be employed to control the amplitude and phase of the current going through the same fixed coils for the purpose of experiment and supervision, but is not needed in the practical operation of the instrument.

In Fig. 3, as in Fig. 1, it is apparent that the root principle upon which I depend for operation is that of combining a continuous current field with an alternating current field, the effects of which when used in this manner are clearly shown in Fig. 2. Using this principle, and with the apparatus shown, any defects beneath the surface, which would ordinarily escape detection by any of the known methods, will produce variations in the curves of Fig. 2 sufficient to be clearly recognized, measured and recorded.

Having thus described my invention, what I claim is:

1. The method of magnetic testing which consists in producing an alternating field about the object to be tested, causing the combined effect of said field and the reactive effect of the resultant flux through the object to produce waves in a secondary circuit, and neutralizing the effects of magnetic leakage when the object is moved through the field with its end adjacent thereto by adjusting the phase of said waves.

2. The method of magnetic testing which consists in moving an object to be tested through an alternating magnetic field, exposing a secondary circuit inductively to the effect of said field and to the reactive effect of the variable flux in said object, so as to produce synthetic waves therein, and neutralizing the effects of magnetic leakage as when the end of the object approaches adjacent to the field by phase adjustment of the synthetic waves in said secondary circuit.

3. The method of magnetic testing claimed in claim 2, with the additional step of detecting the presence of small changes in the leakage flux due to variations in the characteristics or physical condition of the object being tested by phase adjustment to balance out variations not due to said characteristics.

4. A magnetic testing system comprising the following instrumentalities: a separate magnetizing coil energized by continuous current, a second separate magnetizing coil energized by alternating current; a separate secondary coil exposed to the combined fluxes due to both magnetizing coils, a circuit connected to said secondary coil, means for producing harmonics of the fundamental frequency of the alternating magnetizing current, means for inductively combining the asymmetric waves due to the two magnetic fluxes with selected harmonics, and means responsive to the resultant waves to produce sensible indications.

5. A magnetic testing system comprising separate means for producing a continuous magnetic field, separate means for producing an alternating field, a secondary circuit including a separate coil exposed in its entirety to the fluxes due to both of said fields, in common, means to support an object to be tested in inductive relation to said secondary coil, so as to produce in the secondary circuit variable synthetic waves due to the combination of fluxes produced in said object by both said fields, as modified by structural variations in said object, and means responsive to said variable waves in said secondary circuit to produce sensible indications corresponding to the characteristics or physical condition of the object being tested.

6. In a magnetic testing system, a magnetic core adapted to be applied to an object to be tested, a separate primary winding with means to supply the same with continuous current, a second separate primary winding with means to supply the same with alternating current, a separate secondary winding, an indicating means connected to said secondary winding, together with means to neutralize undesirable harmonics in said circuit due to the action of the combined fluxes in the magnetic core.

7. In a magnetic testing system, a pair of separate primary coils, means for supplying the same with continuous current, a third separate primary coil common to the first two primary coils symmetrically arranged with respect thereto, and means for supplying the same with alternating current, and a pair of separate secondary coils spaced apart and surrounding the path of the combined flux due to all of said primary coils adapted to permit the passage of an object to be tested therethrough so as to produce a synthetic magnetic flux therein varying in accordance with the characteristics or physical condition of the object being tested, together with a circuit including said secondaries and indicating means connected therewith whereby variations in said characteristics or physical condition of the object being tested at points adjacent to the responsive secondary coils may be detected.

8. In a magnetic testing system, a pair of separate primary coils supplied with direct current, a third separate primary supplied with alternating current, a pair of separate secondary coils symmetrically positioned with respect to said primary coils and with respect to each other and surrounding the path of the combined flux due to all of said primary coils, the same being electrically connected in series in a secondary circuit so as to oppose each other, and an indicating device connected to said secondary circuit, together with means to support an object to be tested in inductive relation to said secondary coils.

In testimony whereof I hereunto affix my signature.

CARL KINSLEY.